United States Patent
Kobayashi et al.

[15] 3,692,151
[45] Sept. 19, 1972

[54] SPOT-TYPE DISK BRAKE

[72] Inventors: Toyoaki Kobayashi; Yoshinori Mori; Shiego Aiki, all of Kariya, Japan

[73] Assignee: Aishin Seiki Kabushiki Kaisha, Aichi-ken, Japan

[22] Filed: Nov. 13, 1970

[21] Appl. No.: 89,435

Related U.S. Application Data

[63] Continuation of Ser. No. 3,550, Jan. 16, 1970, abandoned, which is a continuation of Ser. No. 765,858, Oct. 8, 1968, abandoned.

[30] Foreign Application Priority Data

Oct. 16, 1967 Japan ..................... 42/66797
Oct. 16, 1967 Japan ..................... 42/66798
Nov. 14, 1967 Japan ..................... 42/95858

[52] U.S. Cl. ............... 188/72.5, 188/73.4, 188/73.6
[51] Int. Cl. .......................................... F16d 55/228
[58] Field of Search .......... 188/72.5, 73.4, 73.6, 73.5

[56] References Cited

UNITED STATES PATENTS 3,331,471 7/1967 Redmayne ................ 188/73.6
3,243,017 3/1966 Kleinstuck ............ 188/72.5 X
3,384,202 5/1968 Swift ....................... 188/73.3

FOREIGN PATENTS OR APPLICATIONS 1,431,049 1/1966 France
905,797 9/1962 Great Britain

*Primary Examiner*—George E. A. Halvosa
*Attorney*—Holman, Glascock, Downing and Reebold

[57] ABSTRACT

A hydraulic motor is mounted on a non-rotating or stationary part of a vehicle and has two opposed pistons in head-to-head arrangement within a single cylinder with open ends, one piston operating in braking operation to press, directly, a friction pad against one flat side of a brake disk fixed coaxially to a rotating part of a wheel, and the other piston operating, through a yoke-like movable member to press another friction pad against the other flat side of the brake disk. The friction pads are held and slidably guided by a part of the hydraulic motor structure, whereby the reaction force due to braking on the friction pads is received and borne by the stationary part.

6 Claims, 9 Drawing Figures

SPOT-TYPE DISK BRAKE

This application is a continuation of our co-pending application Ser. No. 3,550 filed Jan. 16, 1970, now abandoned, which was a continuation of our application Ser. No. 765,858 filed Oct. 8, 1968, now abandoned.

BACKGROUND OF THE INVENTION

This invention relates to hydraulic disk brakes of the so-called spot type. More particularly, the invention concerns a new and improved disk brake in which a hydraulic pressure operated cylinder is positioned on only one side of a brake disk, and braking is accomplished by causing a movable member straddling the brake disk to move in the axial direction of the brake disk.

In a commonly known disk brake in which a hydraulic cylinder is fixed to a movable member, the braking reaction force produced during braking is received by the movable member, which thereby is subjected to a complex combined stress due to this braking force and the clamping force and has, therefore, been required to have high mechanical strength and durability. For this reason, disk brakes of this character have lacked smoothness of action in many cases and have been inordinately heavy because of the necessity of increasing the rigidity of their parts. Another difficulty has been that, since the hydraulic cylinder slides together with the movable member, the momentum at the time of braking is large.

A further difficulty accompanying disk brakes of this class is that, since the movable member undergoes an axial movement relative to a stationary member, means such as, for example, a movement guide for the movable member has been provided in the stationary member to assure positive accomplishment of this axial movement, but this provision has given rise to resistance to the movement by the guide, as an inevitable result, and to other trouble such as excessive corrosion and freezing in winter.

SUMMARY OF THE INVENTION

It is an object of the present invention to overcome the above described difficulties in the prior art by providing a spot-type disk brake having a movable member moving in the axial direction of a brake disk and having the following features.

1. The braking force (reaction) imparted at the time of braking from the brake disk to friction pads squeezing the disk is received and borne by only a stationary member and not by the movable member.

2. In one embodiment of the invention, the movable and stationary members are organized independently, whereby resistance and the possibility of occurrences such as freezing in winter and corrosion are eliminated or greatly reduced.

3. In another embodiment of the invention, the movable and stationary members are coupled by elastic members which are readily deflectable in the axial direction of the brake disk.

According to the present invention, briefly summarized, there is provided a spot-type disk brake having a brake disk fixed coaxially to a rotating part of a wheel and characterized by the combination therewith of a hydraulic motor device mounted on a stationary member, two friction pads respectively disposed on opposite flat sides of the brake disk and actuated by the motor device to squeeze the brake disk in a braking operation, and a movable member through which one of the friction pads is thus actuated, with the two friction pads being supported on and guided by a part of the motor device structure, whereby the reaction force due to braking applied to the friction pads is received and borne by the stationary member.

The nature, principles, details, and utility of the invention will be more clearly apparent from the following detailed description with respect to examples of preferred embodiment of the invention when read in conjunction with the accompanying drawings, in which like parts are designated by like reference numerals.

DETAILED DESCRIPTION

Figure 1:
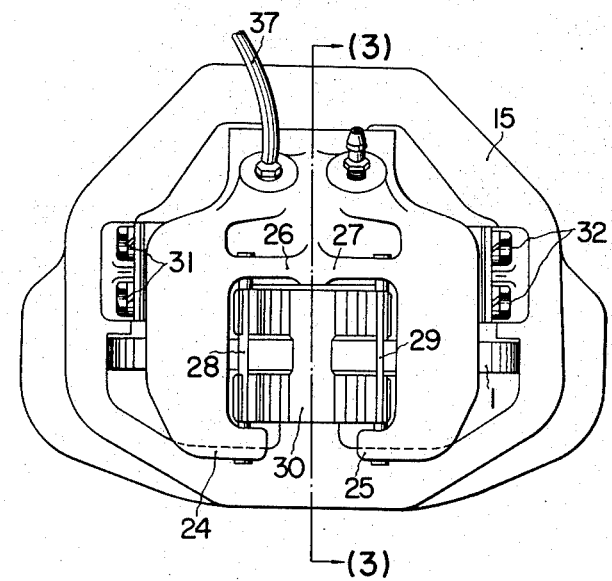
FIG. 1 is a plan view showing one example of a disk brake embodying the invention.
Figure 2:
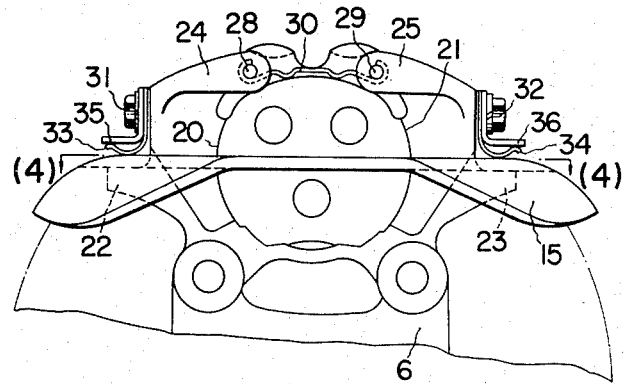
FIG. 2 is a side elevational view, in the direction of the brake disk axis, of the disk brake shown in FIG. 1.
Figure 3:
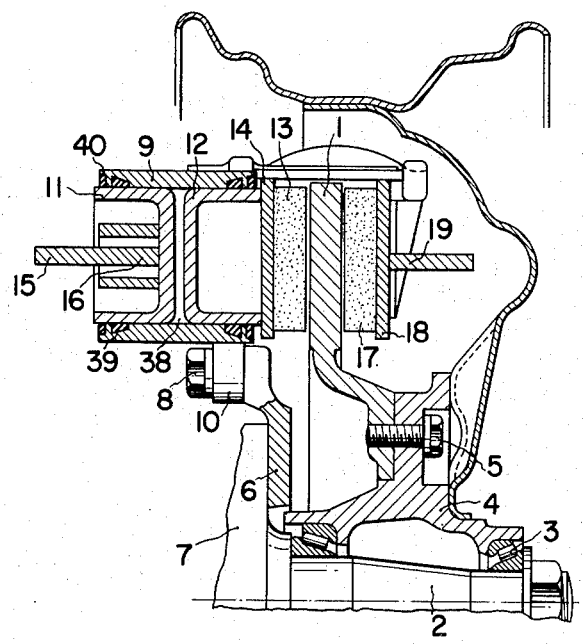
FIG. 3 is an elevational view, in vertical section taken along the plane indicated by line (3)—(3) in FIG. 1 as view in the arrow direction.
Figure 4:
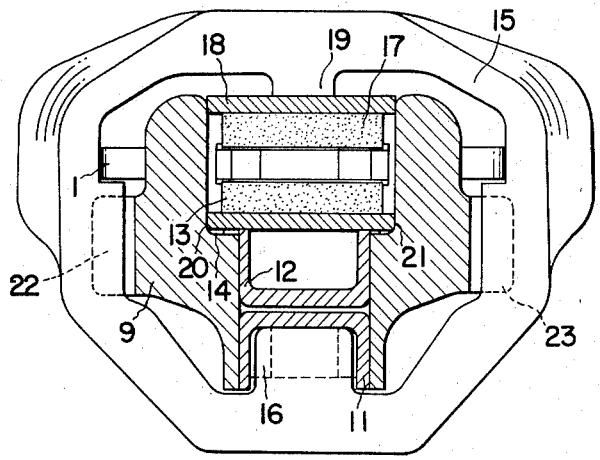
FIG. 4 is a planar sectional view taken along the plane indicated by line (4)—(4) in FIG. 2 as viewed in the arrow direction.

The embodiment of the invention as illustrated in FIGS. 1 through 4 is applied to a vehicle wheel having a hub 4 rotatably supported by bearings 3 on a vehicle axle 2.

In accordance with the invention, a disk 1 is fixed by securing means such as bolts 5 to the hub 4 and constitutes a rotating brake disk. The flank surfaces of this disk 1 are squeezed, during braking, by a caliper-type clamping mechanism as described below which is supported on a stationary member 6 formed integrally with a non-rotating part 7 of the vehicle axle 2.

A hydraulic cylinder 9 having two open ends is fixed at a projecting part 10 thereof to the stationary member 6 by mounting means such as bolts 8. Within the cylinder 9, there are slidably fitted two opposed pistons 11 and 12. One piston 12 is directly engaged with a metal back 14 of a friction pad 13 confronting one of the braking surfaces of the disk 1, while the other piston 11 is engaged with one inner edge 16 of a movable member 15 of yoke or closed-frame shape having an opposite inner edge 19 which is engaged with a metal back 18 of a friction pad 17 facing the other braking surface of the disk 1.

The metal backs 14 and 18 supporting the friction pads 13 and 17 are slidably supported by guide surfaces 20 and 21 formed in an integral, extended part of the hydraulic cylinder 9. At the time of braking, the friction pads 13 and 17 receive brake clamping force respectively from piston 12 and inner edge 19 through metal backs 14 and 18, which are slidably guided by the surfaces 20 and 21 providing resistance against braking frictional force in the direction of rotation of the disk 1.

The movable member 15 is slidably guided and supported by surfaces 22 and 23 formed at projecting parts of the hydraulic cylinder 9. Further projecting parts 24, 25, 26, and 27 are formed at upper part and upper central part of the structure of the cylinder 9 to support at their ends pins 28 and 29 for engagement with a leaf spring 30 functioning to prevent upward movement and escape of the metal backs 14 and 18 and their friction pads 13 and 17.

Furthermore, the movable member 15 is pressed with a suitable force onto the aforementioned guide and support surfaces 22 and 23 of the cylinder 9 by spring holders 35 and 36 of Tee-shaped cross section pressing springs 33 and 34 fixed by bolts 31 and 32 to the structure of the cylinder 9. A common hydraulic fluid chamber 38 is within the hydraulic cylinder 9 between the two pistons 11 and 12 is supplied with hydraulic fluid through a pipe line 37. Furthermore, oil seals 39 and dust seals 40 are provided between the cylinder 9 and the two pistons 11 and 12.

The disk brake of above described organization according to the invention operates in the following manner. When a brake pedal (not shown) is depressed to cause braking, hydraulic fluid under pressure from a master cylinder (also not shown) is supplied through pipe line 37 into fluid chamber 38 between the two opposed pistons 11 and 12 within cylinder 9.

This hydraulic fluid imparts forces to the heads of pistons 11 and 12 in opposite directions, whereby piston 12 directly presses friction pad 13 against brake disk 1 (toward the right as viewed in FIG. 3), while piston 11 simultaneously presses movable member 15 engaged therewith toward the left (as viewed in FIG. 3) thereby to press friction pad 17 leftward against brake disk 1. Thus, brake disk 1 is squeezed by stationary friction pads 13 and 17 and is thereby braked.

Figure 5:
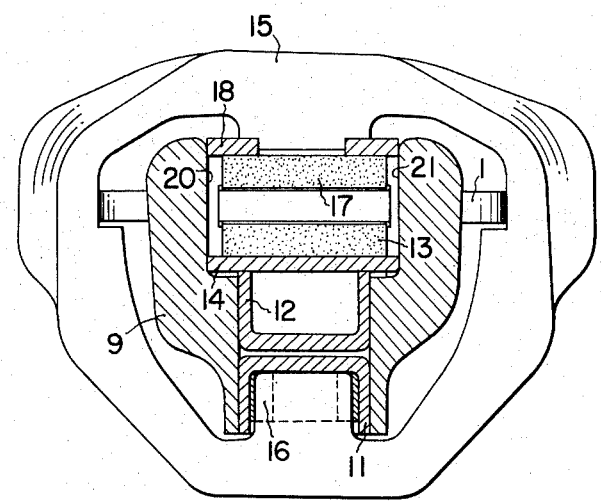
FIG. 5 is a view similar to FIG. 4 showing a modification of the disk brake illustrated in FIGS. 1 through 4.
Figure 6:
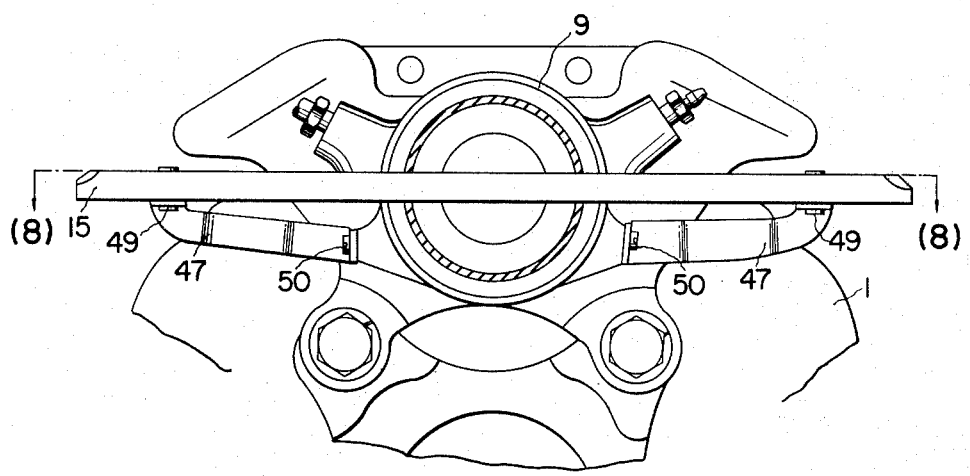
FIG. 6 is a side elevational view, in the direction of the brake disk axis, of another example of a disk brake according to the invention.
Figure 7:
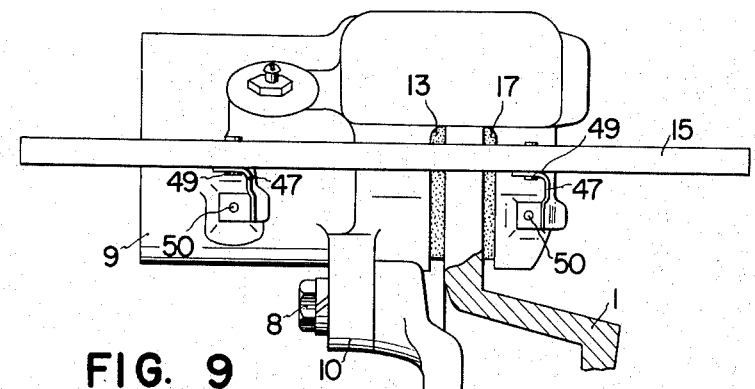
FIG. 7 is a view orthogonal to FIG. 6 as viewed from the right-hand side thereof.
Figure 9:
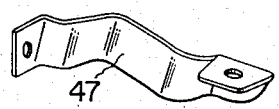
FIG. 9 is a perspective view of a strap, four of which are used in the disk brake illustrated in FIGS. 6, 7, and 8.
Figure 8:
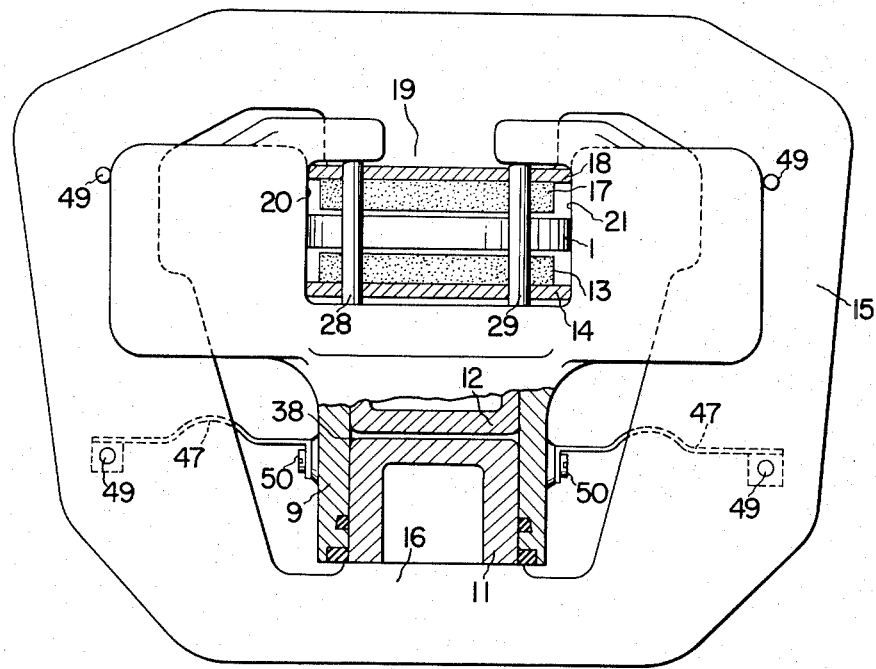
FIG. 8 is a planar view, partly in section, taken along the plane indicated by line (8)—(8) in FIG. 6 in the arrow direction.

FIG. 5 illustrates one example of a somewhat simplified modification of the disk brake shown in FIGS. 1 through 4. In this disk brake, there are no guiding and supporting surfaces for the movable member 15 between the movable member and the stationary members (cylinder 9, for example). Accordingly, frictional resistance and trouble such as freezing in winter between the movable and stationary parts are eliminated. Since the essential organization and the operation of this example are the same as those of the above described example, description thereof will be omitted.

In another embodiment of the invention as illustrated in FIGS. 6 through 9, the general organization of parts is similar to that of the first described disk brake. A novel feature of the instant example is that the movable member 15 for transmitting braking force from the piston 11 to the metal back 18 of the friction pad 17 is coupled to parts of the structure of the cylinder 9 by four straps 47 made of an elastic material, which is an elastic sheet material in the illustrated example. Each strap 47 is fixed at its two ends by suitable fastening means 49 and 50 respectively to the movable member 15 and the cylinder 9.

When hydraulic fluid is supplied from a master cylinder to the hydraulic cylinder 9, the disk brake is actuated and operates as described hereinbefore to cause friction pads 13 and 17 to squeeze brake disk 1, with movable member 15 in this case being moved relative to hydraulic cylinder structure 9 by piston 11 counter to the elastic force of elastic straps 47.

The utility of the disk brake of the above described organization and operation according to the invention lies in the following features. Since the friction pads in the disk brake of the invention are guided and held by and at a stationary member, the stationary member is subjected to combined stress force, that is, a combination of a force perpendicular to the brake disk due to the clamping action of the friction pads on the brake disk and a force parallel to the plane of rotation of the brake disk imparted to the friction pads from the brake disk at the time of braking.

Accordingly, in comparison with disk brakes of known type wherein a movable member is subjected to combined stress force, it is possible to reduce substantially the weight of the moving parts, to increase the smoothness of action of these moving parts, and to increase the rigidity of the movable member.

Furthermore, since the movable member can be fabricated by pressing or punching a metal sheet material, it is more readily and more economically fabricated than cast metal movable members used heretofore. Another feature is that, by not providing guiding and supporting surfaces between the movable and stationary members (as in the example illustrated in FIG. 5), frictional resistance and detrimental occurrences such as freezing between the movable and stationary parts are eliminated.

A further feature of the invention is that, by coupling the movable member and the stationary member by means of elastic members which are readily deflectable in the axial direction (as in the example illustrated in FIGS. 6 through 9) to support the weight of the movable member and, moreover, to facilitate the guide the movement thereof, malfunctioning due to causes such as corrosion and freezing, which tend to occur in disk brakes of the type in which the movable part is guided and supported by a stationary member, is eliminated. At the same time, moreover, smooth and reliable braking operation is afforded.

Furthermore, by selecting a material possessing both semielasticity and plasticity for the elastic coupling members it is also possible to provide automatic adjustment of the clearance gap between the friction pad surfaces and the corresponding brake disk surfaces in a follow-up manner to compensate for wear of the friction pads.

We claim:

1. A spot-type disk brake comprising, in combination: a brake disk fixed integrally and coaxially to a rotating part of a wheel; a hydraulic cylinder fixed to a stationary member on one side of said brake disk and being open at both thereof; two opposed pistons slidably fitted in said hydraulic cylinder and having a common hydraulic fluid chamber therebetween; two friction pads provided on mutually opposite flat sides of said brake disk, one of said pads being engaged with one of said pistons; a movable member engaged with at least the other piston of said two opposed pistons and the other friction pad of said two friction pads, said movable member having a closed ring-shaped substantially flat configuration adapted to encircle said hydraulic cylinder and pad guiding support members which are attached to said hydraulic cylinder; said hydraulic cylinder having two guide surfaces provided with an opening over a part of its outer periphery and extending in a straddling manner over the brake disk to the other side thereof for guiding and holding said two pistons and friction pads, said guide surfaces being hung down at each side of said disk for absorbing the torque created when said pads frictionally engage the brake disk so that substantially no torque is transmitted to said movable member; said pad guiding support members comprising a pair of pins substantially parallel to each other having both ends mounted on said hydraulic cylinder and extending across said peripheral opening therein permitting replacement of said friction pads.

2. A spot-type disk brake comprising, in combination: a brake disk fixed integrally and coaxially to a rotating part of a wheel; a hydraulic cylinder fixed to a stationary member on one side of said brake disk and being open at both ends thereof, said hydraulic cylinder having two guide parts integral therewith provided with an opening over a part of its outer periphery and extending in a straddling manner over said brake disk to the other side thereof; two opposed pistons slidably fitted in said hydraulic cylinder and having a common hydraulic fluid chamber therebetween; two friction pads provided on mutually opposite flat sides of said brake disk and positioned between said guide parts, one of said pads engaged with one of said pistons; a pair of pins substantially parallel to each other having both ends mounted on said hydraulic cylinder and extending across said peripheral opening therein permitting replacement of said friction pads; and a movable member having a closed ring-shaped substantially flat plate configuration, being solely held by the other piston of said two opposed pistons and the other friction pad of said two friction pads for operating independently of said stationary member and said hydraulic cylinder to transmit a force from said other piston to said other friction pad, said two guide parts of said hydraulic cylinder being hung down at each side of said brake disk.

3. A spot-type disk brake comprising, in combination: a brake disk fixed integrally and coaxially to a rotating part of a wheel; a hydraulic cylinder fixed to a stationary member on one side of said brake disk; two opposed pistons slidably fitted in said hydraulic cylinder and having a common hydraulic fluid chamber therebetween; two friction pads provided on mutually opposite flat sides of said brake disk, one of said pads being engaged with one of said pistons; a movable member engaged with at least the other piston of said two opposed pistons and the other friction pad of said two friction pads, said movable member having a closed ring-shaped substantially flat configuration adapted to encircle said hydraulic cylinder and pad guiding support members which are attached to said hydraulic cylinder; said hydraulic cylinder having two guide surfaces provided with an opening over a part of its outer periphery and extending in a straddling manner over the brake disk to the other side thereof for guiding and holding said two pistons and friction pads, and for absorbing the torque created when said pads frictionally engage the brake disk so that substantially no torque is transmitted to said movable member; and two pairs of elastic means coupling said movable and stationary members, one of said pairs being attached at one axial side of said brake disk at opposite sides of the axis thereof, the other said pairs being attached at the other axial side of brake disk at opposite sides of the axis thereof, each of said elastic means having an elastic character such that it is readily deflectable in the brake disk axial direction, both ends of each said elastic means being bent in the brake disk axial direction, one end also being bent flush with and attached to said movable member, the other end being further bent flush with and attached to the outer surface of such stationary member, said movable member being supported solely by said other piston, said other friction pad and said elastic means.

4. A spot-type disk brake comprising, in combination: a brake disk fixed integrally and coaxially to a rotating part of a wheel; a hydraulic cylinder fixed to a stationary member on one side of said brake disk and being open at both ends thereof; two opposed pistons slidably fitted in said hydraulic cylinder and having a common hydraulic fluid chamber therebetween; two friction pads provided on mutually opposite flat sides of said brake disk, one of said pads being engaged with one of said pistons; a movable member engaged with at least the other piston of said two opposed pistons and the other friction pad of said two friction pads, said movable member having a closed ring-shaped substantially flat configuration adapted to encircle said hydraulic cylinder and pad guiding support members which are attached to said hydraulic cylinder; and said hydraulic cylinder having two concave guide surfaces provided with an opening over a part of its outer periphery and extending in a straddling manner over the brake disk to the other side thereof for guiding and holding said two friction pads, said guide surfaces extending over a substantial circumferential portion of said friction pads for absorbing the torque created when said pads frictionally engage the brake disk so that substantially no torque is transmitted to said movable member; said pad guiding support members comprising a pair of pins substantially parallel to each other having both ends mounted on said hydraulic cylinder and extending across said peripheral opening therein permitting replacement of said friction pads.

5. The spot-type disk brake as claimed in claim 4, in which said two concave guide surfaces form a discontinuous cylindrical surface.

6. A spot-type disk brake as claimed in claim 5, in which said cylindrical surface has an axis substantially colinear with the axis of said hydraulic cylinder.

* * * * *